United States Patent [19]

Ahrens

[11] 3,767,960

[45] Oct. 23, 1973

[54] HIGH VOLTAGE REGULATOR

[75] Inventor: Paul Raymond Ahrens, Indianapolis, Ind.

[73] Assignee: RCA Corporation, New York, N.Y.

[22] Filed: June 12, 1972

[21] Appl. No.: 261,627

[52] U.S. Cl. .......... 315/27 TD
[51] Int. Cl. .......... H01j 29/70
[58] Field of Search .......... 315/27 R, 27 TD, 315/28–29

[56] References Cited

UNITED STATES PATENTS 3,638,067 1/1972 Dietz .......... 315/27 TD
3,609,447 9/1971 Hirota et al. .......... 315/27 TD
3,428,856 2/1969 Jones .......... 315/27 D

*Primary Examiner*—Carl D. Quarforth
*Assistant Examiner*—J. M. Potenza
*Attorney*—Eugene M. Whitacre et al.

[57] ABSTRACT

In a horizontal deflection and high voltage generating circuit in a television receiver, the high voltage is regulated to remain substantially constant with variations in picture tube beam current variation and receiver direct current power supply variation. A high voltage variation representative signal coupled to a regulator circuit is first integrated in a manner to increase regulator loop gain without increasing the dissipation in a regulator transistor.

5 Claims, 5 Drawing Figures

HIGH VOLTAGE REGULATOR

BACKGROUND OF THE INVENTION

Figures 1, 2A, 2B, 2C, 2D:
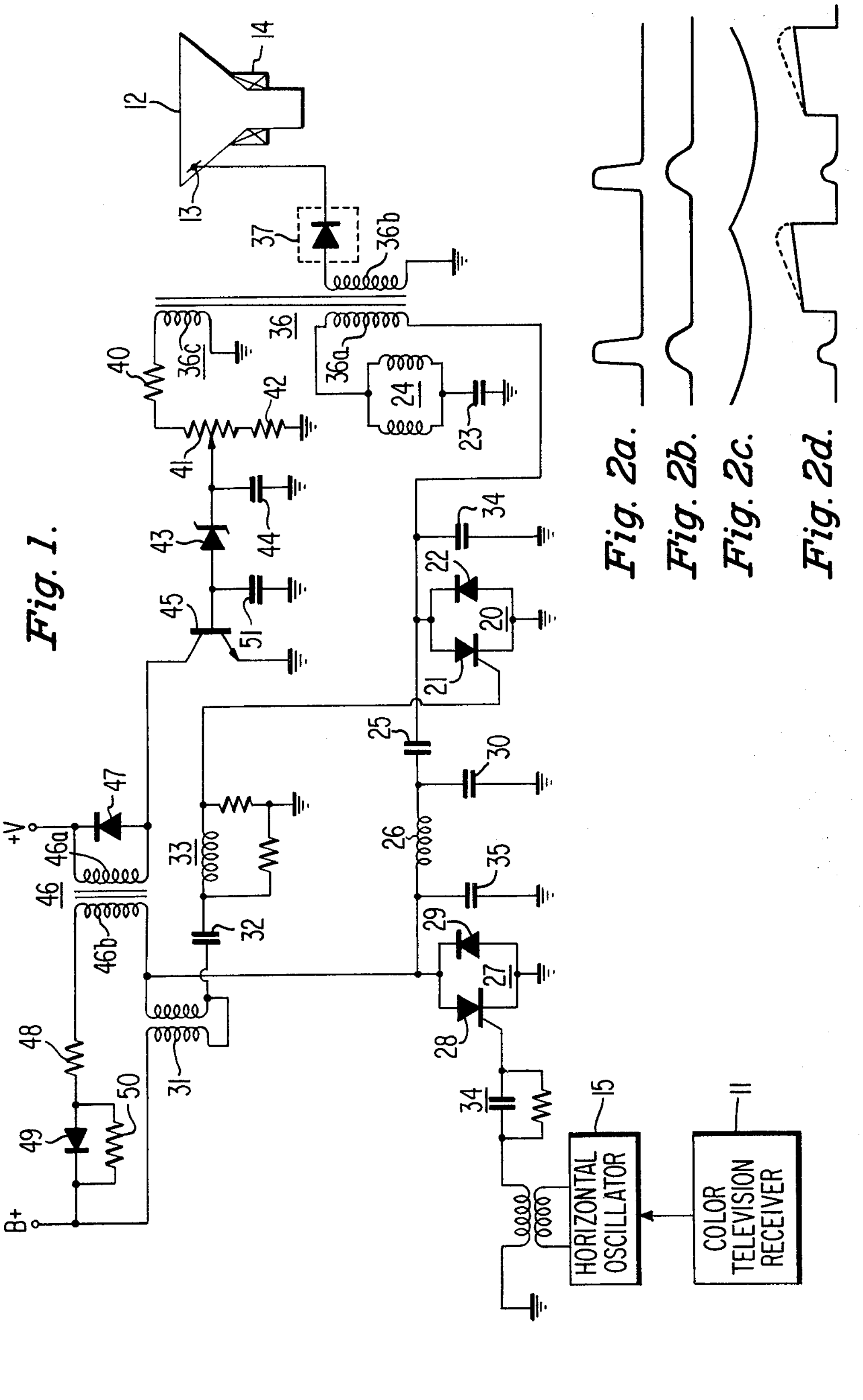

This invention relates to a high voltage regulating circuit for use in a television receiver.

In television receivers it is customary to develop the ultor supply voltage for the kinescope by the rectification of flyback pulses produced in an associated horizontal deflection output transformer. In color television receivers it is customary to provide some form of regulation, such as supplied by a shunt regulator or ballast tube, to keep the high voltage relatively constant. High voltage regulation is necessary to maintain a constant width of the raster scanned on the viewing screen of the kinescope.

High voltage variations can be caused by kinescope beam current variation related to the varying amplitude video signals applied to the beam control electrodes of the kinescope. Additionally, high voltage variations can be caused by power line voltage variations and receiver direct current power supply variations. One scheme for regulating the high voltage against beam current and power line and supply variations is disclosed in U.S. Pat. No. 3,517,253 entitled "VOLTAGE REGULATOR" and issued June 23, 1970, to Wolfgang F. W. Dietz. The arrangement in the Dietz patent provides satisfactory high voltage regulation; however, it is desirable to provide a regulator circuit which reduces the power handling requirements of circuit elements utilized in the regulating apparatus.

It is an object of this invention to provide an improved high voltage regulator circuit with regulation against variations caused by beam current and power supply variations.

In accordance with the invention an improved regulator circuit for a television receiver including a display device and a deflection and high voltage generating circuit for supplying high voltage to the display device and for supplying deflection current includes a voltage source coupled to a variable inductance for supplying current to energy storage means during one part of the deflection cycle. Means are provided for transferring this energy to the high voltage and deflection circuits during another part of the deflection cycle. Regulation control means including an active current control device is coupled to the high voltage generating circuit and to the variable reactance to vary the current through the reactance in response to variations in high voltage. A two-terminal reference voltage source is coupled to the control electrode of the active device and to a source providing high voltage variation signals. An integrating means is coupled to the terminal of the reference voltage source remote from the control electrode and to a point of reference potential to integrate the high voltage variation signal coupled to the control electrode.

A more detailed description of a preferred embodiment of the invention is given in the following description and accompanying drawing of which:

FIG. 1 is a diagram of a color television receiver including a high voltage regulator circuit according to the invention; and FIG. 2*a*, 2*b*, 2*c* and 2*d* illustrate waveforms, not drawn to scale, occurring in the diagram of FIG. 1.

In FIG. 1, a color television receiver which may be of a generally conventional type is illustrated in block form, with, however, details of the horizontal output circuitry and associated high voltage supply shown schematically. In the typical receiver 11, a carrier wave modulated by composite color television signals is received by signal receiving apparatus which includes the usual R.F. tuner, frequency converting apparatus, I.F. amplifier and video detector. Video signals are recovered in the receiving apparatus from the modulated carrier and are amplified in a video amplifier. The amplified video signals are supplied to a keyed AGC circuit which controls amplifier gain in the signal receiving apparatus in accordance with conventional automatic gain control principles. The video signals also are applied to a luminance channel, to a chrominance channel and to a synchronizing signal separator. The chrominance channel processes the color information to a form suitable for application to a color image reproducer. A three-gun shadow mask color kinescope 12 serves as the color image reproducer of the illustrated receiver. The electrode structure of the color kinescope 12 includes respective red, green and blue cathodes; respective red, green and blue control grids; respective red, green and blue screen electrodes (also known as first or accelerating anodes); and an ultor electrode (or final anode) 13. The target assembly of the color kinescope 12 comprises a phosphor screen composed of a regular array of red, green and blue-emitting phosphor dots and an associated perforated mask.

A deflection yoke 14 is associated with the color kinescope 12 and includes vertical and horizontal deflection coils to which are applied respective vertical and horizontal rate scanning currents to cause the individual beams produced by color kinescope 12 to trace a raster on the phosphor screen. A convergence yoke (not shown) which responds to suitable dynamic convergence waveforms to cause the color kinescope beams to properly converge in the target region throughout the scanning of the raster is also customarily associated with kinescope 12.

The color signal outputs of the chrominance channel are applied individually to the respective control grids of the kinescope 12. The respective cathodes are driven by the output of the luminance channel which serves to amplify the luminance component of the composite signal and includes suitable delay apparatus to equalize the delay of the luminance component with the delay encountered by the chrominance information in the chrominance channel.

The output of the sync separator is supplied to the vertical deflection circuits and to a horizontal deflection oscillator 15. The vertical deflection circuits generate a vertical deflection wave for application to the vertical deflection coils of the deflection yoke 14, under the control of vertical synchronizing pulses derived from the sync separator apparatus. The horizontal oscillator 15, which may be a conventional blocking oscillator, develops a periodic switching voltage under the control of horizontal synchronizing pulses derived from the sync separator apparatus. The oscillator 15 is associated with suitable deflection AFC apparatus (not shown) for assuring the desired synchronization.

The periodic switching voltage developed by oscillator 15 is applied to a horizontal deflection circuit comprising the schematic portion of FIG. 1.

The deflection circuit generally is of the type shown and described in U.S. Pat. No. 3,452,244 issued to Wolfgang F. W. Dietz on June 24, 1969, and entitled "ELECTRON BEAM DEFLECTION AND HIGH VOLTAGE GENERATION CIRCUIT." Briefly stated, the deflection circuit comprises a bilaterally conductive trace switching means 20 comprising a silicon controlled rectifier (SCR) 21 and a diode 22 for coupling a relatively large energy storage capacitor 23 across horizontal deflection windings 24 during the trace portion of each deflection cycle. A first capacitor 25 and a commutating inductor 26 are coupled between trace switching means 20 and a bilaterally conductive commutating switching means 27. Switching means 27 comprises a silicon controlled rectifier 28 and a diode 29. A second capacitor 30 is coupled from the junction of capacitor 25 and inductor 26 to ground. Transient suppression capacitors 34 and 35 are coupled from switching means 20 and 27, respectively, to ground. A main voltage supply B+ is coupled to a relatively large supply inductor 31, which in turn is coupled to the junction of inductor 26 and commutating switching means 27.

First triggering means 33 is coupled from a capacitor 32, one end of which is coupled to supply inductor 31, to the gate electrode of SCR 21 for initiating conduction therein during the trace portion of each deflection cycle. Second triggering means 34 is coupled from horizontal oscillator 15 to the gate electrode of SCR 28 for initiating conduction therein near the end of the trace portion of each deflection cycle.

Trace switching means 20 is coupled through a primary winding 36*a* of a horizontal output transformer 36 to horizontal deflection coils 24. A high voltage winding 36*b* of transformer 36 provides stepped up voltage flyback pulses. These pulses are rectified by the high voltage rectifier assembly 37 for application to the high voltage or ultor terminal 13 of kinescope 12.

An auxiliary winding 36*c* of transformer 36 provides a source of positive pulses as shown in FIG. 2*a*. These pulses are the flyback pulses occurring during the retrace portion of each horizontal deflection cycle. The pulses are coupled through a resistor 40, a potentiometer 41, and another resistor 42 which provide a voltage divider network for the pulses. The wiper arm of potentiometer 41 is coupled to the cathode terminal of a zener diode 43. An integrating capacitor 44 is coupled from the cathode of the zener diode to ground. The anode of zener diode 43 is coupled to the base electrode of a regulator transistor 45. A capacitor 51 is coupled from the anode of zener diode 43 to ground. The capacitance of capacitor 51 is selected to be larger than the junction capacitance of zener diode 43 such that any variation in zener diode capacitance characteristics from one diode to another will have minimum effect on the operation of the circuit.

The emitter electrode of transistor 45 is coupled to ground and the collector electrode is coupled through the parallel combination of a control winding 46*a* of a saturable reactor 46 and a recovery diode 47 to a source of positive potential +V. The voltage of this source may be about 75 volts. One end of the secondary or load winding 46*b* of reactor 46 is coupled through a resistor 48 and the parallel combination of a recovery diode 49 and a resistor 50 to a source of positive potential B+. The voltage of this source may be about 160 volts. The other end of secondary winding 46*b* is coupled through supply inductor 31 to the B+ supply. Further, this terminal of control winding 46*b* is also coupled to switching means 27 and commutating inductor 26.

During operation, at the beginning of the trace portion of each horizontal deflection cycle, the current in horizontal deflection coils 24 is at a maximum amplitude and is flowing through forward biased diode 22 through winding 36*a* and the deflection coils 24 to charge capacitor 23. The deflection current declines substantially linearly thereafter, and at approximately mid-way through the trace portion of the cycle, the current through deflection coils 24 passes through zero, reverses and switches from diode 22 to SCR 21. SCR 21 is placed in standby condition in preparation for this switching of current paths by means of a gating signal provided by triggering circuit 33. As SCR 21 starts to conduct, capacitor 23 now transfers energy from itself to deflection coils 24 as the current passes through SCR 21.

During the time that trace switching means 20 is conducting as described above, the commutating switching means 27 is open or nonconductive. Capacitors 25 and 30 are coupled in parallel across the current supply comprising inductor 26 and supply inductor 31 coupled to the main B+ supply. Inductor 31, which stored energy during the previous commutating portion, during the trace portion of the deflection cycles transfers a portion of its stored energy to capacitors 25 and 30 while they are coupled in parallel. The voltage across parallel capacitors 25 and 30 typically increases during this interval as shown by the solid line ramp portion in FIG. 2*d*. This is the voltage across commutating switch 27. A portion of the energy thus stored in capacitors 25 and 30 is transferred during the retrace portion of each deflection cycle to deflection winding 24 and to the voltage generating circuits associated with transformer 36 to replenish the losses incurred during the deflection cycle.

In order to initiate the retrace portion of each deflection cycle and to transfer the energy from capacitors 25 and 30 to the transformer 36 and deflection coils 24, a pulse is produced by horizontal oscillator 15 several microseconds before the desired end of the trace portion of the deflection cycle. This pulse is shaped by triggering means 34 and the resultant waveform is applied to the gate electrode of commutating SCR 28. SCR 28 commences conduction and thereby completes a first closed circuit path comprising SCR 28, inductor 26 and capacitor 25 and a second circuit path comprising SCR 28, inductor 26 and capacitor 30. The current in deflection winding 24 temporarily continues to increase since trace SCR 21 remains conductive. The energy stored in capacitors 25 and 30 is circulated in the first and second paths in a resonant manner.

At the same time inductor 31 is coupled by commutating SCR 28 directly across the B+ supply, producing an approximately linearly increasing current and substantial energy storage in inductor 31. The current component associated with capacitor 25 serves to turn off SCR 21 because that component flows through SCR 21 in the reverse direction, and after a further short interval of conduction by trace diode 22, the retrace portion of the deflection cycle is initiated.

During the retrace portion the current in horizontal deflection coils 24 is reversed as a result of a resonant half-cycle energy exchange between coils 24 and a combination of capacitors 25 and 30, the inductor 26 and the equivalent tuned circuit of transformer 36. A high voltage flyback pulse waveform is produced during this retrace portion in the transformer winding 36*b* and is rectified by the high voltage rectifier unit 37 for producing a direct operating voltage of the order of 25,000 volts at the ultor terminal 13 of kinescope 12. The magnitude of the high voltage pulse is related directly to the peak magnitude of the deflection current in coils 24 and to the magnitude of the energy associated with capacitors 25 and 30 at the beginning of the retrace portion of the deflection cycle. The peak magnitude of the deflection current also is dependent upon the energy associated with capacitors 25 and 30. As described in the aforementioned U.S. Pat. No. 3,517,253, the values of capacitors 25 and 30 and inductor 26 may be selected such that in the absence of additional regulating means, a percentage change in peak deflection current produces at least a one-half, but preferably equal, corresponding percentage change in high voltage.

In addition to the regulation produced by selecting the values of the components stated just above, additional regulating means in accordance with the invention are provided for regulating the high voltage from changes caused by variation in beam current and in power supply voltages.

An auxiliary winding 36*c* of transformer 36 provides a source of positive pulses occurring during the retrace interval of the deflection cycle. These pulses are illustrated in FIG. 2*a*. Any variation of the high voltage will be correspondingly reflected in the amplitude of the pulses obtained from winding 36*c*. These pulses are coupled from the winding through a voltage divider comprising resistor 40, potentiometer 41 and resistor 42, the latter being connected to ground. The pulses are coupled via the wiper arm of potentiometer 41 through the zener diode 43 to the base electrode of regulator transistor 45.

The collector current of transistor 45, illustrated in FIG. 2*b*, will vary as the voltage level of the pulses applied to the transistor differs from the reference voltage provided by the series connection of zener diode 43 and the base-emitter junction of transistor 45. Assuming an increase in the B+ supply voltage, which would tend to produce an increase in the ultor supply and in the deflection current, there will be an increase in the positive voltage level of the pulses coupled to the base of transistor 45. Such signals will cause transistor 45 to conduct with the resultant collector current as illustrated in FIG. 2*b*. This current will be conducted through the control winding 46*a* of reactor 46. The increasing current in control winding 46*a* has the effect of reducing the inductance of the secondary winding 46*b*. The variation of current in winding 46*b* is illustrated in FIG. 2*c*. Since winding 46*b* is in parallel with supply inductor 31, the inductance of this parallel combination is also reduced. The decreased inductance of this parallel inductor increases the voltage across capacitors 25 and 35 during the initial half of the trace interval but decreases during the last half of trace (see dotted line portion of waveform 2*d*) as energy is returned via inductor 31 to the B+ supply. This results in the energy available for transfer to the high voltage circuit and deflection windings 24 substantially constant. When the B+ voltage decreases, the inductance of winding 31 is increased to maintain constant image width and high voltage.

If the high voltage decreases due to increased kinescope beam current, conduction in transistor 45 will decrease. This will result in an effective increased inductance of the parallel combination of reactor secondary winding 46*b* and supply inductor 31, which in turn allows more energy to be stored in capacitors 25 and 30. This increased stored energy will result in an increase in the high voltage generated by the deflection circuit and coupled to ultor terminal 13.

The voltage source +V, which is coupled to the collector electrode of transistor 45, is unregulated. Therefore, any variation in this voltage, such as caused by variations in the AC power line voltage, will alter the conduction characteristics of regulator transistor 45 and will result in a compensating change in the generated high voltage ultor supply.

The capacitor 44 coupled between the cathode electrode of zener diode 43 and ground serves to integrate the pulses applied through the zener diode to regulator transistor 45. Integrating the pulse increases the loop gain of the regulating loop by widening the pulse and thereby making transistor 45 conduct for a longer portion of each deflection cycle, resulting in increased regulator loop sensitivity and efficiency of the regulation. Normally, it would be expected that applying an integrated pulse to a transistor would increase its turn-on time, as the pulse has a greater rise time resulting from integration which results in power being undesirably dissipated in the transistor. However, the placement of integrating capacitor 44 in the circuit according to the invention overcomes this problem. As the voltage across capacitor 44 equals the zener diode 43 voltage plus the emitter-base drop of transistor 45, the transistor starts to conduct. Because of the current path through zener diode 43 and transistor 45, the dv/dt across the capacitor approaches zero and any current which was flowing in capacitor 44 becomes available as additional base drive for the transistor, driving it harder and hence faster into saturation and reducing the transistor power dissipation. In the aforementioned U.S. Pat. No. 3,517,253, the source of high voltage variation representative signals was the "S" shaping capacitor, which supplied a relatively smooth voltage. This voltage did not require integration to achieve high regulator loop gain. However, the relatively smooth voltage source results in some power being dissipated in the regulator transistor. In contrast, the circuit according to this invention provides the advantage of high loop gain achieved by integrating the high voltage variation representative pulses and also provides quick turn-on time of the transistor 45 for efficient high voltage regulation and permits the use of a lower power rated transistor.

One measure of the effectiveness of a high voltage regulator of the type described herein is how well the voltage can be regulated with a given variation in picture tube beam current. With the circuit as described herein, except with capacitor 44 removed, and with 0–1.5 milliamperes variation in beam current, the high voltage at a nominal potential of 25,000 volts was found to vary 3,300 volts. With the integrating capacitor 44 in the circuit in accordance with the invention, the high voltage variation for a 0–1.5 milliamperes beam current variation was only 2,900 volts, or about a 12 percent improvement in high voltage regulation.

What is claimed is:

1. In a television receiver including an image display device and a deflection and high voltage generating circuit for supplying high voltage to said display device and for supplying deflection current, a regulator circuit comprising:

supply means comprising a voltage source coupled to a variable reactance for supplying current to energy storage means during one portion of each deflection cycle;

means for coupling said energy storage means to said deflection and high voltage generating circuit during another portion of each deflection cycle;

regulation control means including an active current control device coupled to said deflection and high voltage generating circuit and to said variable reactance and being responsive to variations in said high voltage for varying said reactance to control said current supply to said energy storage means for controlling the current supply to said deflection and high voltage generating circuit to thereby regulate said high voltage;

said regulation control means further including a two-terminal reference voltage source coupled to the control electrode of said active device and to a source providing pulses representative of high voltage variations, and integrating means coupled between the terminal of said reference voltage source remote from said control electrode and a point of reference potential for integrating said pulses coupled through said reference voltage source to said control electrode said reference voltage source providing a path for current stored in said integrating means such that said current renders said active current control device fully conducting relatively quickly when the voltage across said capacitor exceeds the combined voltage drops of said reference voltage source and the conducting threshold voltage of said active current control device.

2. A regulator circuit according to claim 1 including a source of pulses representative of said high voltage variations coupled to the junction of said integrating means and said two-terminal reference voltage source.

3. A regulator circuit according to claim 2 wherein said two-terminal reference voltage source is a zener diode.

4. A regulator circuit according to claim 3 including a capacitor having a value larger than the capacitance of said zener diode coupled between the junction of said zener diode and said control electrode to a point of reference potential.

5. In a television receiver including an image display device and a deflection and high voltage generating circuit for supplying high voltage to said display device and for supplying deflection current, a regulator circuit comprising:

supply means comprising a voltage source coupled to a variable reactance for supplying current to energy storage means during one portion of each deflection cycle;

means for coupling said energy storage means to said deflection and high voltage generating circuit during another portion of said deflection cycle;

a regulator transistor having its emitter-collector current path coupled in circuit with said variable reactance for controlling the current flowing therethrough;

a zener diode coupled between a source of pulses representative of variations of said high voltage and the base electrode of said transistor; and a capacitor coupled from the electrode of said zener diode remote from said base electrode to a point of reference potential for integrating said pulses for effecting control of current through said emitter-collector path of said transistor, thereby to control the current supplied to said energy storage means for controlling the regulation of said high voltage said zener diode providing a path for current stored in said capacitor such that said current renders said transistor fully conducting relatively quickly when the voltage across said capacitor exceeds the combined voltage drops of said zener diode and the base-emitter junction of said transistor.

* * * * *

UNITED STATES PATENT OFFICE
CERTIFICATE OF CORRECTION

Patent No. 3,767,960 Dated October 23, 1973

Inventor(s) Paul Raymond Ahrens

It is certified that error appears in the above-identified patent and that said Letters Patent are hereby corrected as shown below:

Page 1, in the drawing, the network labelled "34" should be labelled -- 10 --. In the drawing, sheet 1, Fig. 1, the network labelled "34" should be labelled -- 10 --. Column 3, line 25, delete "34" and substitute therefor -- 10 --. Column 4, line 44, delete "34" and substitute therefor -- 10 --.

Signed and sealed this 27th day of August 1974.

[SEAL]
Attest:

McCOY M. GIBSON, JR.
Attesting Officer

C. MARSHALL DANN
Commissioner of Patents

RM PO-1050 (10-69)
30 6/72

USCOMM-DC 60376-P69
* U.S. GOVERNMENT PRINTING OFFICE 1969 O—366-334